(12) United States Patent
Ether et al.

(10) Patent No.: US 7,578,185 B2
(45) Date of Patent: Aug. 25, 2009

(54) RESOLVER-BASED WHEEL SPEED SENSOR AND METHOD OF USING SAME

(75) Inventors: Russ Ether, Niles, MI (US); Mark B. Hanson, Niles, MI (US)

(73) Assignee: Honeywell International Inc., Morristown, NJ (US)

( * ) Notice: Subject to any disclaimer, the term of this patent is extended or adjusted under 35 U.S.C. 154(b) by 412 days.

(21) Appl. No.: 11/352,994

(22) Filed: Feb. 14, 2006

(65) Prior Publication Data

US 2006/0250124 A1 Nov. 9, 2006

Related U.S. Application Data

(60) Provisional application No. 60/652,724, filed on Feb. 15, 2005.

(51) Int. Cl.
*G01P 15/00* (2006.01)
(52) U.S. Cl. ............... 73/488; 324/160; 73/494; 73/504.01; 73/504.3
(58) Field of Classification Search .......... 73/488, 73/491, 494, 504.01, 504.03, 510, 530; 324/160
See application file for complete search history.

(56) References Cited

U.S. PATENT DOCUMENTS

| | | | | |
|---|---|---|---|---|
| 4,153,935 A | * | 5/1979 | Jones et al. | ............... 701/301 |
| 4,633,966 A | | 1/1987 | Fotheringham | |
| 4,637,488 A | | 1/1987 | Fotheringham et al. | |
| 4,755,905 A | | 7/1988 | Telecky, Jr. | |
| 4,864,284 A | * | 9/1989 | Crayton et al. | ............... 340/635 |
| 5,162,798 A | * | 11/1992 | Yundt | ............... 341/116 |
| 5,260,650 A | | 11/1993 | Schwesig et al. | |
| 6,084,398 A | | 7/2000 | Howard | |
| 6,255,794 B1 | * | 7/2001 | Staebler | ............... 318/605 |
| 6,810,316 B2 | | 10/2004 | Yokoyama et al. | |
| 6,834,244 B2 | | 12/2004 | Kim | |
| 6,894,484 B2 | | 5/2005 | Takizawa et al. | |
| 2003/0083797 A1 | | 5/2003 | Yokoyama et al. | |
| 2003/0098685 A1 | | 5/2003 | Blaettner | |
| 2004/0019446 A1 | | 1/2004 | Kim | |
| 2004/0169488 A1 | * | 9/2004 | Maeda et al. | ............... 318/801 |
| 2005/0065696 A1 | | 3/2005 | Yokoyama et al. | |

FOREIGN PATENT DOCUMENTS

JP 06324064 A * 11/1994

OTHER PUBLICATIONS

Zimmerman, Rhod; "Resolvers as Velocity and Position Encoding Devices", Control Sciences, Inc. www.controlsciences.com/resolver_application_data.shtml, 15 pages, printed Nov. 7, 2005.
Data sheet for Analog Devices Variable-Resolution, Monolithic Resolver-to-Digital Converter Model AD2S80A, from www.analog.com, 2000.
Data sheet for Analog Devices Variable-Resolution, Resolver-to-Digigal Converter Model AD2S83, from www.analog.com, 2000.

* cited by examiner

*Primary Examiner*—Hezron Williams
*Assistant Examiner*—Samir M Shah
(74) *Attorney, Agent, or Firm*—Birch, Stewart, Kolasch & Birch, LLP

(57) ABSTRACT

A method of determining a speed of a wheel that involves providing a resolver having a rotor and a stator which resolver produces at least one output signal, operatively connecting the rotor to a wheel such that the resolver is rotated by the rotation of the wheel, producing digital signals indicative of a position of the rotor relative to the stator based on the at least one output signal, and calculating a velocity of the wheel from the digital signals. The digital signals may be used alone or in conjunction with analog wheel speed signals. Also a speed sensor for practicing this method.

15 Claims, 3 Drawing Sheets

RESOLVER-BASED WHEEL SPEED SENSOR AND METHOD OF USING SAME

CROSS-REFERENCE TO RELATED APPLICATIONS

The present application claims the benefit of prior U.S. Provisional Patent Application No. 60/652,724, filed Feb. 15, 2005, the entire contents of which is hereby incorporated by reference.

FIELD OF THE INVENTION

The present invention is directed toward an improved wheel speed sensor, and, more specifically, toward a resolver-based wheel speed sensor capable of producing a usable speed signal over a range of speeds including zero.

BACKGROUND OF THE INVENTION

Frequency-based wheel speed sensors such as tachometers are well known. However, at low speeds, the signal output by these sensors becomes unusable. These speed sensors, when used on aircraft, for example, often do not produce a usable signal at speeds below 5 to 15 knots.

The outputs from these sensors may be used to control deceleration or differential wheel deceleration at high speeds or to control anti-skid brakes, for example. At low speeds, when deceleration is nearly complete and when skidding is unlikely to occur, it is generally not critical to obtain accurate speed information. However, in certain applications, those involving unmanned vehicles, for example, a wheel speed sensor that produces a usable signal down to and including zero speed would be highly desirable or necessary. The output of such a sensor would enable a controller to determine whether the vehicle is at rest or slowly rolling off a runway, for example, when there is no pilot in the vehicle to make such a determination.

Resolvers are generally used to measure the position of a rotating member, such as a motor shaft attached to a rotor, with respect to a fixed element such as a stator. A resolver is essentially a rotary transformer designed so that the coefficient of coupling between the rotor and stator varies with the relative positions of the rotor and stator. Usually resolvers have two windings on a rotor and two windings on a stator positioned at right angles to each other. When a rotor winding is excited with an AC reference signal, the stator windings produce AC voltage outputs that vary in amplitude according to the sine and cosine of rotor position. The stator signals from the resolver are input to a specialized A/D converter known as a resolver-to-digital (R/D) converter. The R/D converter multiples input sine and cosine values by cosine and sine terms, forms the difference and drives its output angle until a null value is reached. The output of the R/D converter is a digital signal that indicates the position of the rotor with respect to the stator and may vary, for example, from 0 to 1 over the course of a single rotation.

Some R/D converters, including models AD2S80A and AD2S83A made by Analog Devices of Norwood, Mass., can also produce an output voltage proportional to velocity. A resolver that outputs an analog position signal is discussed in U.S. Pat. No. 5,260,650, the entire contents of which are hereby incorporated by reference. However, these analog signals do not provide velocity information down to zero speed and are limited in their precision.

It would therefore be useful to provide a vehicle wheel sensor that is usable over a wide range of vehicle speeds including zero speed and that does not suffer from the foregoing problems.

SUMMARY OF THE INVENTION

These problems and others are addressed by the present invention, a first aspect of which comprises a wheel speed sensor that includes a resolver having a stator and a rotor operatively connectable to a rotating vehicle wheel and producing at least one output signal. A resolver-to-digital converter having an input receives the at least one output signal and produces digital output signals indicative of an angular position of the rotor with respect to the stator. The system also includes a digital controller having an input receiving the resolver output signals and calculating a velocity of the wheel based on the received resolver output signals.

Another aspect of the invention comprises a method of determining a speed of a wheel that involves providing a resolver having a rotor and a stator which produces at least one output signal indicative of the relative positions of the rotor and the stator and operatively connecting the rotor to a wheel such that the rotor is rotated by the wheel. Digital signals indicative of the position of the wheel are produced from the resolver output, and a velocity of the wheel is calculated from these position signals.

BRIEF DESCRIPTION OF THE DRAWINGS

These features and aspects of the invention and others will be better understood after a reading of the below detailed description together with the following drawings wherein.

DETAILED DESCRIPTION

Figure 1:
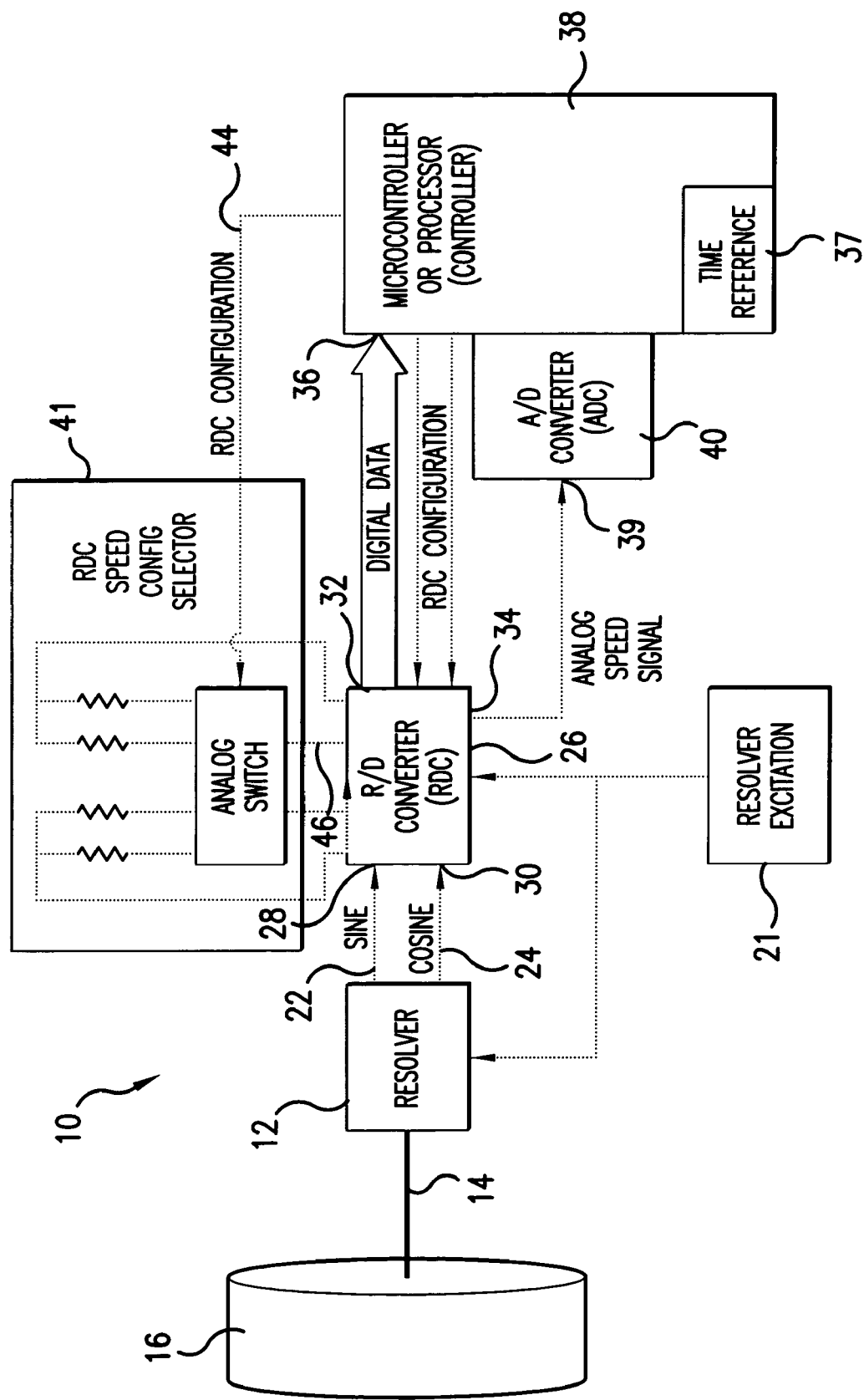
FIG. 1 is a diagram schematically showing a speed sensing system including a resolver according to an embodiment of the present invention.

Referring now to the drawings, wherein the showings are for purposes of illustrating preferred embodiments of the invention only and not for the purpose of limiting same, FIG. 1 illustrates a velocity sensing system 10 including a resolver 12 having an input shaft 14 connected to a wheel 16, which may comprise, for example, the wheel of an aircraft. The resolver may be connected in a manner similar to the manner that tachometers are currently connected to wheels as is known to those of ordinary skill in the art. Other arrangements wherein the resolver shaft is angled with respect to or offset from the wheel axis and operatively connected thereto with suitable gearing could also be used depending on the geometry of the aircraft or other vehicle in which the velocity sensing system is used.

Figure 2:
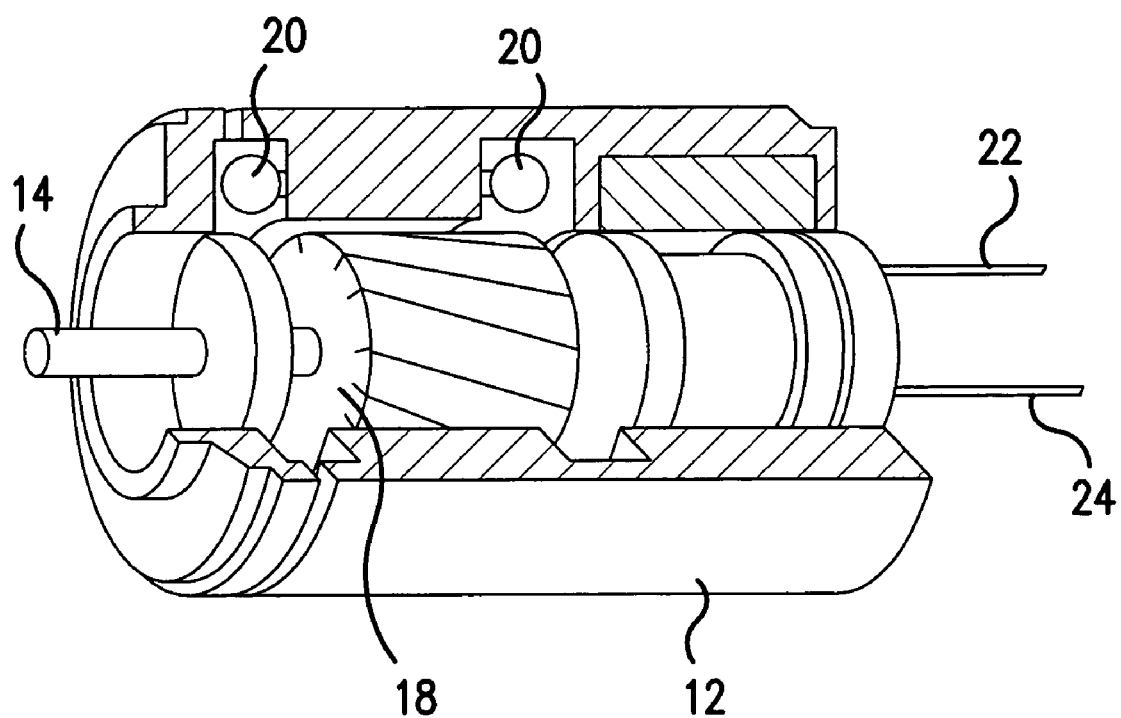
FIG. 2 is a schematic view, partly in section, of the resolver of FIG. 1.

As illustrated in FIG. 2, resolver input shaft 14 is connected to a rotor 18 in the resolver 12, and as the input shaft 14 rotates, it causes rotor 18 to rotate with respect to resolver coils 20. One of the stator coils is excited with, for example, a 20 kHz reference signal from resolver excitation circuit 21, and as the rotor rotates, two of the stator windings produce AC voltage outputs that vary in amplitude according to the sine and cosine of shaft position. These signals are output on resolver first and second output lines 22 and 24. A second, independently excited redundant resolver (not shown) may be also be used to increase the reliability of the system.

An R/D converter 26 has a first input 28 connected to resolver first output line 22 and a second input 30 connected to resolver second output line 24. R/D converter 26 may comprise, for example, an R/D converter sold by Analog Devices as model number AD2S80A or AD2S83A. Among the various outputs of R/D converter 26 are a digital position signal output 32 and an analog velocity signal output 34. Position signal output 32 of R/D converter 26 is connected to a first input 36 of a controller 38 and analog velocity signal output 34 of R/D converter 26 is connected to an input 39 of an analog/digital converter 40, the output of which is provided to controller 38. The R/D converter samples the output signals on first and second output lines 22 and 24 at a rate based on the highest expected wheel speed and produces a digital readout indicative of the angular relationship between the shaft and the stator. Preferably, the signal is sampled at a rate that is at least twice the anticipated maximum wheel speed, expressed in revolutions per second, to avoid the possibility of aliasing. A higher sampling rate, such as four samples per revolution, or higher, could be used to provide unambiguous direction information and a higher tolerance for a missed sample. For purposes of this discussion, a sampling rate of approximately six times per revolution will be considered.

The position signal on position signal output 32 is a digital signal that varies from 0 to 1 as the rotor rotates with respect to the stator and rolls over to 0 from the upper end of the range. The number of signals output per second may be determined based on a given application; in embodiment described below, 500 signals per second are output. These signals are received by controller 38, which may comprise the main computer of an aircraft, which receives the signal on first input 36 and, using a time reference signal from time reference circuit 37, takes the derivative of this signal to determine a velocity based on the changing position indicated by the R/D converter output signal.

An aircraft operates over a wide range of speeds. At landing, an aircraft may be moving at 200 knots, well over 200 miles per hour, and the aircraft wheels may therefore rotate as fast as about 6000 rpm. Resolvers that can operate at speeds up to around 20,000 rpm are known; however such resolvers sample at a bit rate that does not provide sufficient precision at low speeds, speeds measured in feet per minute, for example, to be useful in many situation. According to one embodiment of the present invention, this issue is addressed by operating the R/D converter in different modes which modes are selected by a selector 41 controlled by controller 38 by sending a mode selection signal on line 44 to a mode input 46 of R/D converter 32. In the present embodiment, R/D converter 38 is shiftable between a first mode operating with 12 bit precision and a second mode operating with 16 bit precision; however, other operating modes having different precisions and the use of more than two operating modes is also within the scope of this invention and will depend on, for example, tire diameter and the maximum anticipated rotation rate of the wheel on which the sensor will be mounted.

Figure 3:
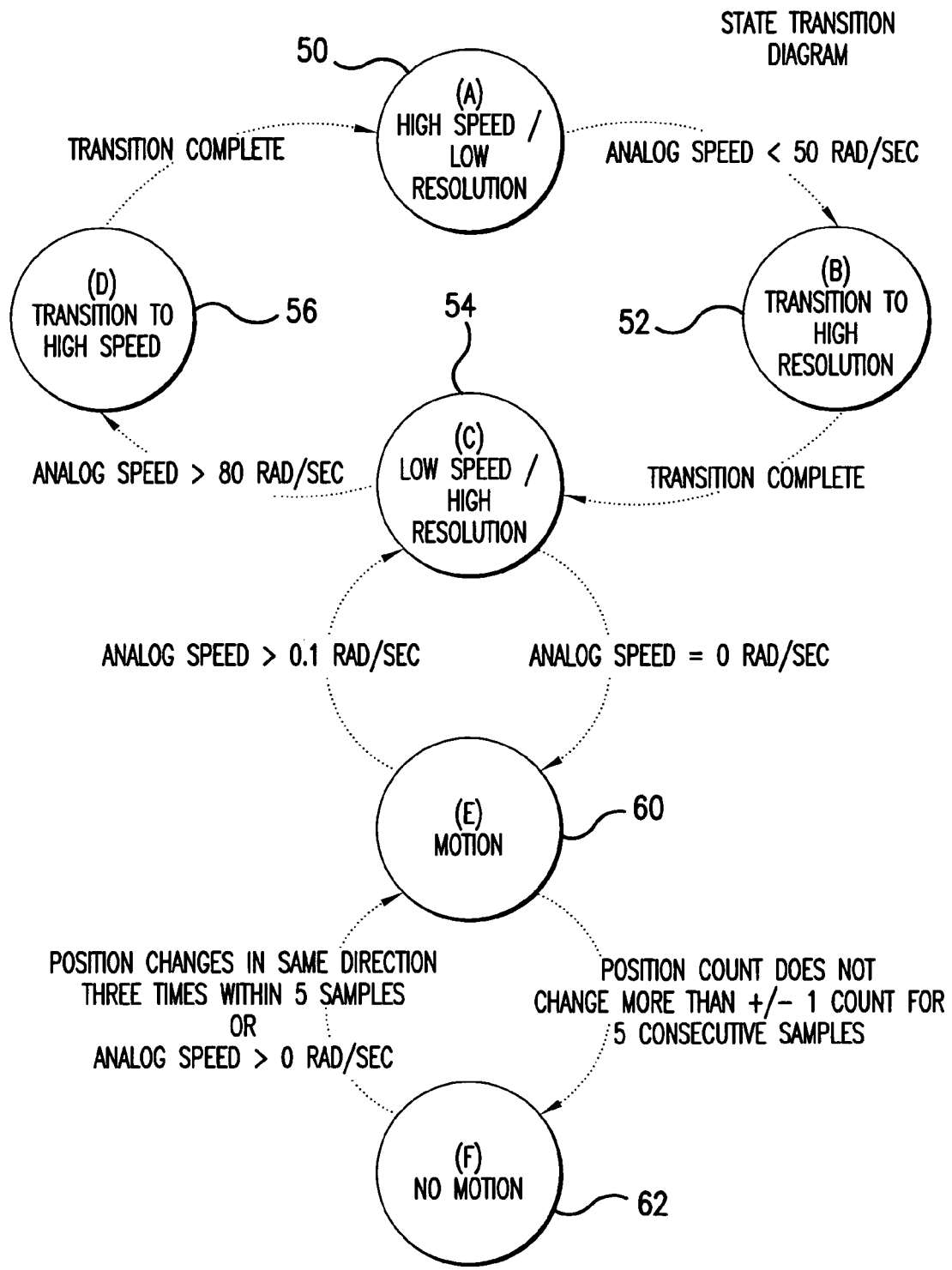
FIG. 3 is a chart illustrating different operating states of the system of FIG. 1.

With reference to FIG. 3, the system 10 operates in a first, high speed, low resolution state 50 as long as the detected analog speed remains above a first value, 50 radians per second, for example. When the detected analog speed drops below this rate, a transition illustrated at 52 occurs to a second, low speed, high resolution state 54. System 10 continues to operate in this second state 54 until the detected analog speed increases to above a second level, 80 radians per second, for example, and then transitions at 56 back to first state 50. This active switching allows for the use of highly accurate position information at low speeds while using the same resolver and R/D converter to provide good speed information at higher speeds.

When the detected velocity is 0, controller 38 sets a zero flag or otherwise produces an output to indicate that all motion has stopped. A no motion state or stopped state 62 is entered when no or substantially no change in position is detected. For example, if the output of resolver 12 does not change by more than plus or minus one count over five consecutive samples, stop state 62 is entered, and a signal may be produced indicating that the wheel has stopped rotating. If the position of rotor shaft 14 changes a given number of times in a single direction over a period of time, three changes in the same direction over the course of five samples, for example, motion state 60 is entered and a velocity output will be produced. Controller 38 remains in the low speed, high resolution mode 54 while the vehicle is in the stopped state. The outputs of controller 38 can be used to provide velocity information on a display screen, not shown, or be used by other control systems that require velocity information for taking appropriate control actions.

The analog speed signal can be used over a wide range of speeds, down to and including low speeds such as 0.1 radians per second, for example. For an 18 inch diameter aircraft wheel, for example, this rate of rotation represents a vehicle speed of 0.9 inches per second or 4.5 feet per minute. An unmanned aircraft moving at such a speed could easily cause damage to itself or surrounding objects if allowed to roll at that rate for even a short period of time. With the digital speed sensor measuring these low speeds and the stop signal or flag confirming that motion of the vehicle is truly stopped, better control over unmanned vehicles in particular can be provided.

Controller 38 can provide a velocity signal that is based on either the velocity calculated from the position information received at input 36 or on the analog velocity signal that is input to analog/digital converter 40. The application that is using the velocity signal will play a role in determining which of these signals is selected. For example, the analog signal has little or no latency and reflects the velocity of the wheel in real time. However, the precision of the analog signal, in digital terms, is limited to approximately 11 or 12 bits. Speeds calculated from the position information output by R/D converter 32, on the other hand, can have 16 bit precision or higher. Because these speeds are based on a comparison of two wheel positions, however, they will have a small latency, on the order of 10 msec. When using a velocity signal to predict the onset of a wheel skid, it may be preferable to sacrifice precision and obtain the velocity in real time. Such applications would thus rely on the analog velocity signal produced by R/D converter 32. When controlling wheel deceleration, on the other hand, the extra precision provided by the digital position information may more than make up for the small latency inherent in such signals. The digital signal would then be used for such applications. The availability of two signals to the controller also provides a degree of redundancy. These signals, may, for example, be compared periodically, and in the event that a difference between the speeds indicated by the analog speed signal and the digital position signal differ by more than a predetermined amount, a possible error condition can be noted. One or the other signal, such as the analog speed signal, could then be selected for use alone until the source of the difference in speeds indicated by the analog and digital signals is determined.

EXAMPLE 1

The operation of the system may be further understood with reference to the following example which is based on an 18 inch diameter tire moving at a maximum speed of 200 knots wherein the maximum desired sample interval is 1 radian. This provides over six measurements per wheel revolution.

The 18 inch wheel, having a circumference of about 54.5 inches, moves at a linear speed of 200 knots, or 337.6 feet per second. The wheel will therefore rotate through an angle of 1.333 radians for each linear foot that the vehicle travels on a support surface such as a runway. At 200 knots, this wheel will have an angular velocity of 450 radians per second. Therefore, the desired sample rate is at least 450 Hz, and a sampling rate of 500 Hz will be assumed for this example. A wheel moving at one foot per second will rotate 9.17 arc minutes between samples taken at 500 Hz:

1 foot/sec*1.333 radians/foot*0.002 sec/sample*57.2958 degrees/radian=0.1528 degrees=9.17 minutes.

Each bit must therefore represent no more than 9.17 minutes, and this level of resolution requires 12 bit precision. Greater precision can be obtained for lower maximum rotation rates.

Various advantages are provided by the speed sensors according to embodiments of the present invention. Resolvers do not use permanent magnets or optical devices, the performance of which tends to be temperature limited. Therefore, higher temperature operation should be possible with a resolver-based speed sensor. In addition, resolvers operate even at low wheel speeds as opposed to tachometers which often require gearing to speed up the wheel speed so that one wheel revolution produces several turns of the tachometer. Thus, resolvers require fewer components and may be generally more mechanically reliable than tachometer based systems.

The present invention has been described herein in terms of a specific embodiment; however, it will be understood that obvious modifications and additions to this embodiment will become apparent to those skilled in the relevant art upon a reading and understanding of the foregoing description. It is intended that all such modifications and additions form a part of the present invention to the extent they fall within the scope of the several claims appended hereto.

We claim:

1. A wheel speed sensor comprising:
   a resolver having a stator and a rotor operatively connectable to a rotating vehicle wheel and producing a sine analog output and a cosine analog output;
   a resolver-to-digital converter having an input receiving said sine analog output and said cosine analog output and producing digital output signals indicative of an angular position of the rotor with respect to the stator wherein said resolver-to-digital converter is shiftable between a first mode sampling at a first rate and a second mode sampling at a second rate; and
   a digital controller having an input receiving said digital output signals and calculating a velocity of the wheel based on said digital output signals.

2. The wheel speed sensor of claim 1 wherein said resolver-to-digital converter produces an analog velocity signal, the wheel speed sensor further including an analog/digital converter receiving said analog velocity signal and providing a digital velocity signal to said digital controller.

3. The wheel speed sensor of claim 2, wherein the digital controller includes the analog/digital converter.

4. The wheel speed sensor of claim 2, wherein the digital output signals and the analog velocity signal are compared to determine an error.

5. The wheel speed sensor of claim 1, wherein said digital controller shifts said resolver-to-digital converter to said second mode when the velocity is greater than a first value.

6. The wheel speed sensor of claim 5 wherein said digital controller shifts said resolver-to-digital converter to said first mode when the velocity is less than a second value, said second value being less than or equal to said first value.

7. The wheel speed sensor of claim 6 wherein said digital controller produces a stopped signal when a given number of said resolver-to-digital converter output signals show substantially no change in the angular relationship of the rotor and stator.

8. The wheel speed sensor of claim 6, wherein the velocity includes a linear velocity with respect to a support surface.

9. The wheel speed sensor of claim 5 wherein said first mode is a high-precision mode and said second mode is a low-precision mode.

10. The wheel sensor of claim 9 wherein said first mode is a sixteen-bit precision mode and said second mode is a twelve-bit precision mode.

11. The wheel speed sensor of claim 5 wherein said first sampling rate is less than said second sampling rate.

12. The wheel speed sensor of claim 1 wherein said digital controller produces a stopped signal when the velocity of the wheel is zero.

13. The wheel speed sensor of claim 1 wherein said velocity comprises a linear velocity with respect to a support surface.

14. The wheel speed sensor of claim 1, wherein the resolver-to-digital-converter is separate from the digital controller.

15. The wheel speed sensor of claim 1, wherein the digital controller includes the resolver-to-digital-converter.

* * * * *

UNITED STATES PATENT AND TRADEMARK OFFICE
CERTIFICATE OF CORRECTION

PATENT NO.       : 7,578,185 B2                    Page 1 of 1
APPLICATION NO.  : 11/352994
DATED            : August 25, 2009
INVENTOR(S)      : Ether et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 604 days.

Signed and Sealed this

Seventh Day of September, 2010

David J. Kappos
*Director of the United States Patent and Trademark Office*